Oct. 16, 1923.
H. PLAUSON
PROCESS FOR THE MANUFACTURE OF ACETALDEHYDE OR ACETIC ACID
Filed Jan. 13, 1921
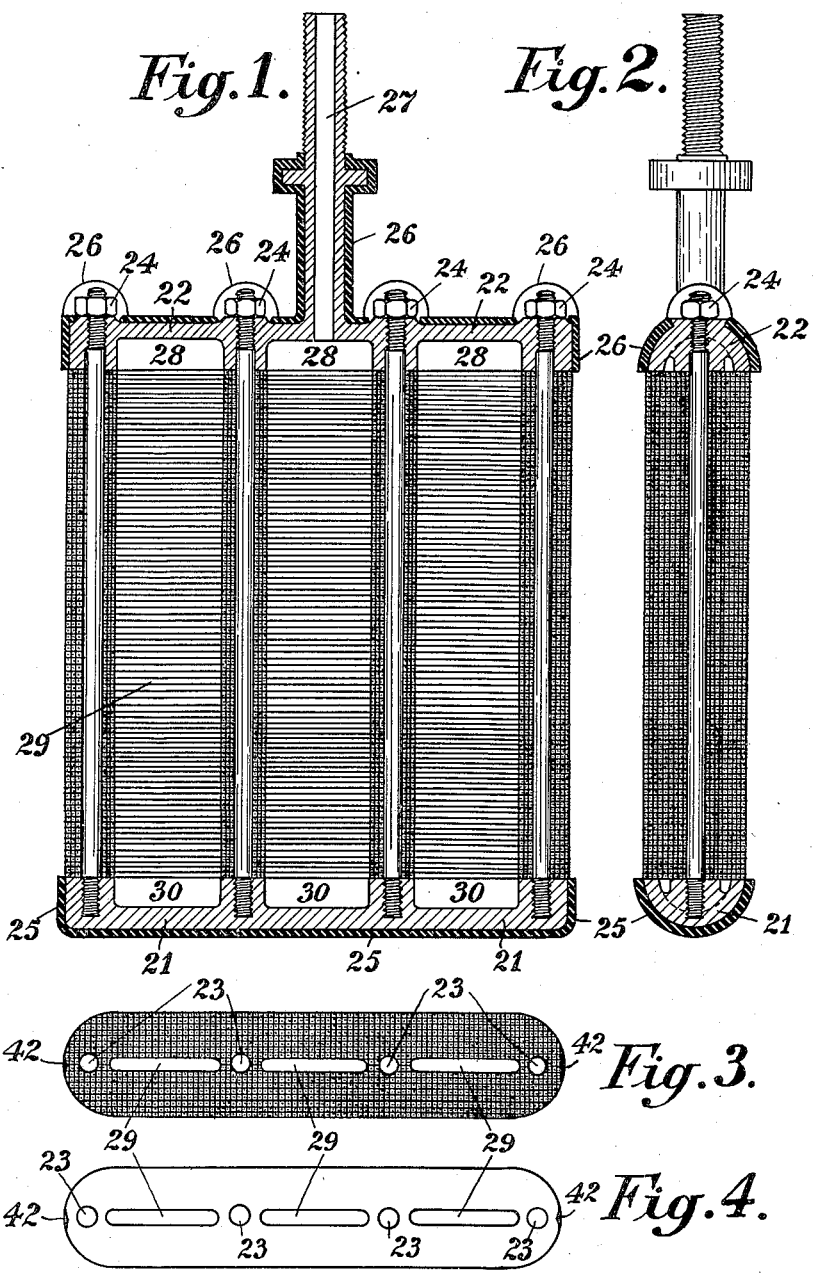

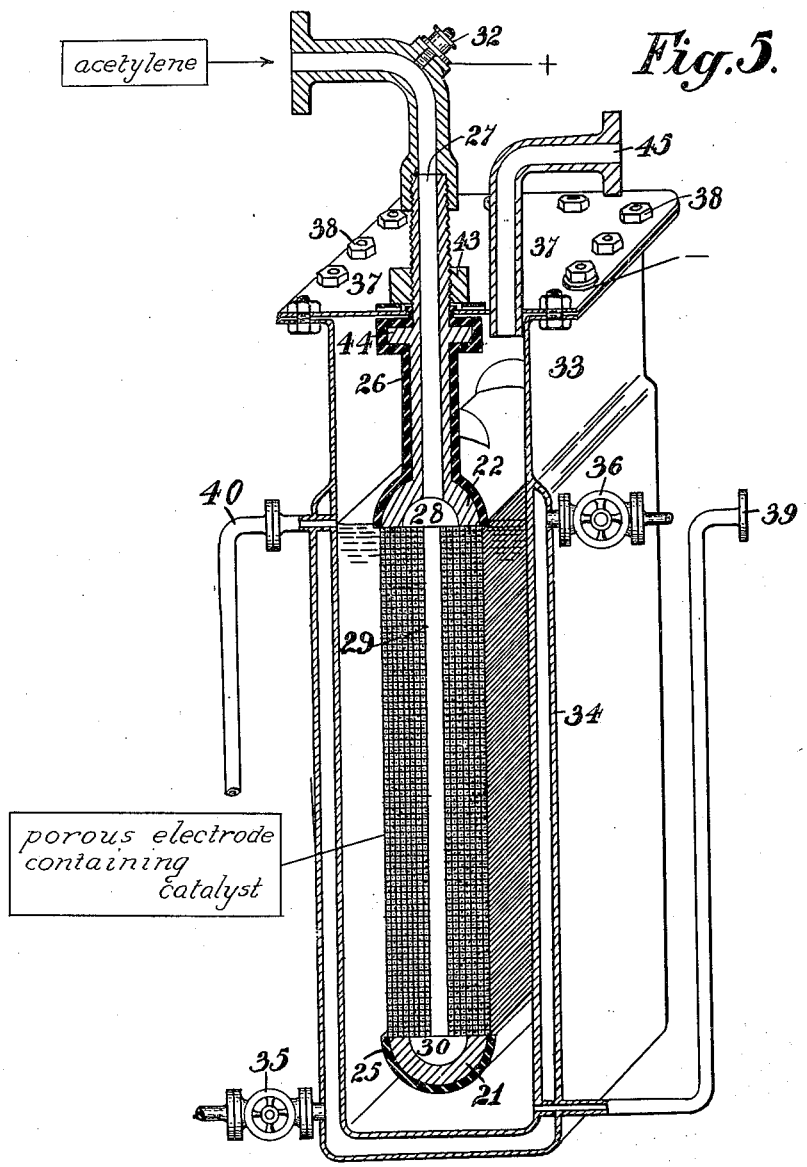

Patented Oct. 16, 1923.

1,471,058

UNITED STATES PATENT OFFICE.

HERMANN PLAUSON, OF HAMBURG, GERMANY.

PROCESS FOR THE MANUFACTURE OF ACETALDEHYDE OR ACETIC ACID.

Application filed January 13, 1921. Serial No. 437,119.

*To all whom it may concern:*

Be it known that I, HERMANN PLAUSON, Esthonian subject, residing in Hamburg, Germany, have invented a certain new and useful Process for the Manufacture of Acetaldehyde or Acetic Acid, of which the following is a specification.

It is known that acetaldehyde or acetic acid can be obtained from acetylene in presence of acids and mercuric salts or mercuric oxide either with or without oxidizing agents and numerous proposals have been made to improve this reaction. None of the processes hitherto employed is really continuous over long periods of time since it is necessary to interrupt the aldehyde preparation to purify the apparatus from the oxidizing additions from time to time or more particularly to work up the whole reaction liquid.

According to the present invention acetaldehyde or acetic acid is employed by passing acetylene through the pores of a conductive porous electrode as described in my co-pending application Serial No. 437,111 and whose pores are filled with an insoluble mercury compound. According to this invention therefore it is not necessary for mercury compounds to be present in the reaction liquid proper since the acetylene is forced through the porous conductive electrode and comes intimately in contact with the insoluble mercury compounds in its pores so that it absorbs water with great speed and in great quantities to form acetaldehyde. The electrode preferably takes the form of a hollow member to the inside of which the acetylene is supplied so that it can be blown or sucked through the pores.

In the course of time the mercury compounds in the pores would be reduced to metal and thus made inactive; hence according to the invention the electrodes are made anodes in an acid solution and connected with a source of current of from 1.7 to 2 volts or more. This achieves the result that the mercury compounds are steadily oxidized in the pores during the operation and therefore retain their catalytic activity unchanged. Suitable electrodes will now be described.

The mercury compounds can be employed as such or mixed with oxides, peroxides, or porous fibrous substances of inorganic or organic nature such as asbestos, paper, thread, wool, cellulose, cellulose ester powder with or without binding agents. To obtain acetaldehyde it is preferable to perform the reaction at 50 to 60° C. and to distil off the aldehyde continuously when it is obtained practically pure on cooling. If a vacuum is employed to suck the acetylene through the porous conductive electrode, the distillation of the acetaldehyde is facilitated.

The invention further includes the continuous manufacture of acetic acid from acetylene by the use of porous conductive electrodes. Each particle of the gas comes simultaneously in contact with a particle of mercury and with water and the acetaldehyde so formed is at once oxidized almost quantitatively to acetic acid by anodic oxygen at a suitable potential, e. g. 3 to 3.5 volts is preferable. Phosphoric acid is conveniently employed as the acid means and the concentration is preferably such that its boiling point is higher than that of acetic acid at the pressure in question, which is of extreme importance for the manufacture of acetic acid, since a commercial process for electrolytic manufacture giving a good yield is only possible when the acetic acid is distilled off at once. It is important that when using phosphoric acid, the anode may be formed of wire netting of iron or similar substances whose surfaces are chemically more or less strongly oxidized by heating, as porous carrier of the mercury powder.

A suitable electrode is illustrated in the accompanying drawings in which:—

Fig. 1 is a section through the vessel.

Fig. 2 a cross section through one of the electrodes, and

Figs. 3 and 4 are horizontal sections.

Fig. 5 represents an external view partly in section of the electrodes in position.

The electrodes in this form consist of two cap portions 21 and 22 which may consist of a ferrosilicon alloy or good graphite. Four rods are screwed into the lower cap portion carrying wire nets in such manner that the rods pass through the round perforations 23 of the net. The rods and net must be of good conducting material and protected by coating with gold or platinum against the attack by the current if for example the cells are to be used in acid solution. In other cases however it may prove sufficient to make the metallic parts of resistant iron-nickel or iron-aluminium alloys or simply of iron, e. g. steel wire.

A layer of the mercury compound e. g. mercurous oxide or mercury phosphate is applied to the nets by pressing a paste thereon or in other ways.

After a sufficient number of nets has been applied, the cap portion 22 is added and the whole firmly connected by the nut 24. The upper cap portion 2 has a prolonged attachment 27 which is hollow and serves to supply acetylene to the interior of the electrode. The cap portions 21 and 22 are insulated by ebonite or the like portions 25 and 26.

Instead of nets it is also possible to use perforated sheets or corrugated sheets which may be stamped out so as to be of similar shape and layers of mercuric oxide are deposited between such conductive layers.

The openings 9 in the plate form hollow spaces inside the electrodes to allow of uniform distribution of the acetylene; these spaces are connected by the spaces 29 and 30 (see Fig. 5).

The nets may be soldered at the point 32 (Figs. 3 and 4) e. g. with hard solder, or autogenously, to secure good electrical contact.

Fig. 5 illustrates the mounting of such an electrode in a metallic vessel 33 which may be of any suitable resistant material; e. g. nickel, cast iron steel, nickel steel, ferrosilicon or platinized copper or copper coated with gold, depending on the solution. It is provided with a double jacket 34 which may serve for heating the cell with steam under control of the valves 35 and 36. The cell is hermetically closed by a metallic lid 37 provided with a nut 38.

The anode is fixed in the middle of the lid 37 by the nut 43 and completely insulated by insulation discs 44 from the lid.

The acetaldehyde or acetic acid may be distilled off from the vessel through a separate pipe 45 and the liquid level may be maintained at the same height by connecting individual cells through pipes of ebonite or other insulator; the liquid may be introduced through pipes 39 and regulated through openings 40.

The cells can be connected in parallel or in series as required and liquid may be passed through the various cells by a small compressor.

The cell itself may be connected as cathode with the negative pole and the electrode through the contact 32 with the positive pole of the source of current. Obviously the cells can be of different size and either two, three or more anodes (or cathodes) may be employed in one cell and in this case intermediate cathodes (or anodes) are also employed. In the same way the number of hollow spaces 29 can also be varied. The inflow of fluid to the space 28 can be individual or in common.

*Example 1.*

Manufacture of acetaldehyde. The electrolyte consists of a 25% solution of phosphoric acid. The temperature of operation is 40 to 60° C. and the potential is from 1.6 to 1.8 volts. A stream of acetylene either pure or saturated with water is passed through the anode at an average velocity of 30 to 60 litres per hour per square decimetre. The yield of acetaldehyde amounts to 94 to 98% with 3 to 1% of acetic acid. The acetaldehyde is continuously distilled off during its formation since the liquid is maintained always at 40 to 60° C. by a steam jacket. The cells work regularly for months without attention. The composition of the electrolyte is corrected in a collecting basin with the addition of suitable quantities of water and the acetic acid collected therein is driven off. The mercury does not go into solution but remains on the anode except for small particles which crumble off; these at once fall to the bottom of the cell and exert no action on the acetaldehyde.

*Example 2.*

Manufacture of acetic acid. The electrolyte is a solution of phosphoric acid of boiling point over 130° C. The potential is 3 to 4 volts. The normal velocity of introduction of acetylene in presence or absence of water vapour amounts to 20 to 30 litres per hour per sq. decimetre. The temperature is 121 to 125° C. but it can be reduced to 80 to 90° C. by employing a vacuum. The yield of acetic acid amounts to 75 to 86% of which about 60% is in concentrated form, and about 20% to 10% of acetaldehyde. The acetaldehyde is obtained by using a distillation apparatus mounted on the collecting basin for the electrolyte, and it can be transformed into acetic acid chemically by oxidation. At the above temperature the acetic acid is distilled off as it is formed and removed from the sphere of action of the current. The water consumed is replaced in the collecting basin.

In both examples the reaction proceeds in the following manner. The acetylene is passed through the part 11 and the tube 7 into the space 8 when it distributes itself uniformly in all the hollow spaces 9; it is forced through the porous mass containing the mercury compounds lying between the nets and sheets so that it comes very intimately in contact with the mercury compound at a certain pressure and simultaneously reacts with water when it is either hydrated to acetaldehyde if the current is close to or below the de-composition potential of water or further oxidized to acetic acid if sufficient quantities of oxygen are present at the anode in the nascent state. The connecting pipes must obviously be made of acid resisting material.

Having now particularly described and ascertained the nature of my said invention and in what manner the same is to be performed, I declare that what I claim is:—

1. The process of hydrating acetylene which comprises passing acetylene in presence of water through a porous conductive electrode containing a mercury compound and supplying said electrode with current.

2. The process of preparing acetaldehyde which comprises passing acetylene in presence of water through a porous conductive anode containing a mercury compound and supplying current to said anode at a potential of at least 1.5 volts.

3. The process of preparing acetic acid which comprises passing acetylene in presence of water through a porous conductive anode containing a mercury compound and supplying current to said anode of potential sufficient to effect anodic oxidation.

4. The process of continually hydrating acetylene which consists in passing it in presence of water through a porous conductive anode containing an insoluble mercury compound as catalyst and supplying said anode with current.

5. The step in the manufacture of acetic acid which includes anodic oxidation of acetaldehyde in presence of a mercury compound within the pores of a porous conductive anode supplied with electric current.

6. The process of hydrating acetylene to produce valuable products which comprises passing acetylene through a porous conductive anode containing a mercury compound and immersed in a liquid, supplying electric current to said anode, and maintaining said liquid at a temperature above the boiling point of the product at the prevailing pressure.

7. The process of producing acetic acid which comprises passing acetylene through a porous conductive anode containing a mercury compound and immersed in a phosphoric acid solution, supplying said anode with current and maintaining a temperature high enough to distil off acetic acid continuously.

8. The process of producing valuable compounds from acetylene which comprises passing the acetylene through a porous structure containing an insoluble mercuric compound immersed in an aqueous liquid.

9. The process of producing acetaldehyde which comprises passing acetylene through a porous structure containing an insoluble mercury compound immersed in an aqueous medium and re-oxidizing the mercury as required.

10. The process of hydrating acetylene which comprises passing acetylene through a porous conductive electrode immersed in equeous liquid, causing said acetylene to interact with water in presence of a mercury compound and supplying current to said electrode.

11. The process of hydrating acetylene which comprises passing acetylene through a porous conductive electrode immersed in an aqueous liquid, and causing said acetylene to interact with water in presence of a catalyst while supplying current to said electrode.

In witness whereof I have hereunto signed my name this 30 day of Dec., 1920, in the presence of two subscribing witnesses.

HERMANN PLAUSON.

Witnesses:
　H. T. ANNSTINE,
　W. A. BEESTON.